July 13, 1926.
F. A. REED
1,592,156
LATHE TOOL HOLDER
Filed Dec. 1, 1922
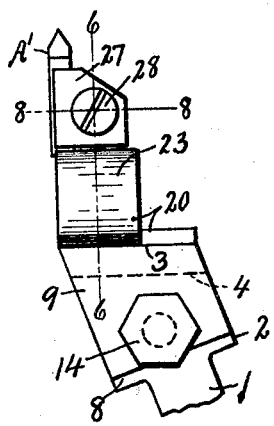
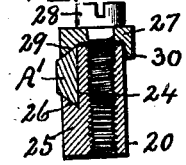
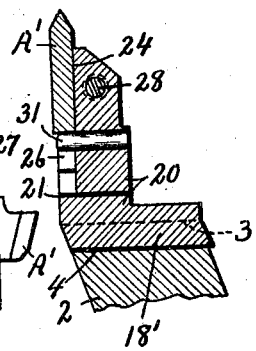
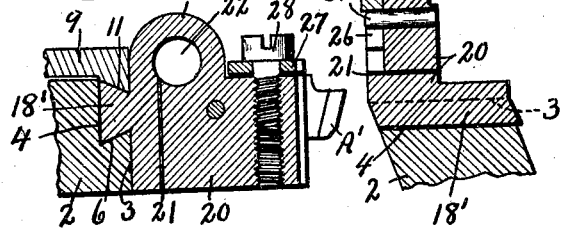
WITNESS
Harold L. King.
INVENTOR
F. A. Reed
BY
Howard
ATTORNEY.

Patented July 13, 1926.

1,592,156

UNITED STATES PATENT OFFICE.

FRED A. REED, OF SYRACUSE, NEW YORK.

LATHE TOOL HOLDER.

Application filed December 1, 1922. Serial No. 604,304.

This invention relates to a lathe tool holder adapted to be used more particularly in metal working for receiving and supporting boring and thread cutting tools.

The main object is to make the tool clamp separate from its supporting head or shank and to provide those parts with interengaging ways slidable one upon the other whereby the clamp with the tool therein may be adjusted relatively to the head or shank without disturbing the fixed position of the latter on the tool post or carriage thus permitting the use of different tool clamps on the same head or shank.

Another object is to provide simple and efficient means whereby the clamp may be tightened and firmly held in any position of adjustment along and upon the head or shank.

Other objects and uses relating to specific parts of the device will be brought out in the following description.

In the drawings:

Figures 1 and 2 are respectively a top plan and a side elevation of a modified tool holder showing other features of my invention, portions of the shank being broken away.

Figures 3, 4 and 5 are detail sectional views taken respectively on line 6—6, Figure 1; 7—7, Figure 2; and 8—8, Figure 1.

The device as shown comprises a shank —1— elongated in one direction and preferably rectangular in cross section, adapted to be clamped in any suitable tool post on the carriage or other support of a lathe and is provided with an enlarged head —2— having its outer end face —3— disposed in a plane diagonal to that of the shank —1— and provided with a lengthwise recess —4— extending downwardly from its upper face, and forming a lengthwise rib —5— having a transversely beveled lower face —6—.

The upper side of the head —2— is also recessed at —7— from its front end face rearwardly in a plane at right angles thereto and forming a transverse rib or stop shoulder —8— at the rear of the recess.

A clamping plate —9— is seated in the recess —7— with its rear edge against the shoulder —8— and its front edge provided with a downwardly projecting rib —10— having a beveled lower face —11— similar to the beveled face —6— and in opposed relation thereto to form with the recess —4— and beveled face —6—, a lengthwise slot or groove of dove-tail cross section.

The head —2— and clamping plate —9— are provided with registering apertures —12— and —13— one of which as the aperture —13— is threaded and engaged by a clamping bolt —14— which is inserted in said apertures.

The tool clamping member —20— has its rear side provided with a rib —18'— of dovetail cross section and is adapted to slide endwise in the groove or recess —4— for adjusting the tool to the work.

The intermediate portion of the tool clamping member —20— is split or divided transversely through one side at —21—, the upper portion of said split or division being enlarged by a lengthwise bore —22— thereby forming an upwardly arched spring portion —23— between the front and rear side of the member —20— to enable the tool supporting portion at the front of the split to yield slightly when engaged with the work, and thereby to avoid "chattering" or excessive vibration of the tool particularly when finishing the cut so that the latter may be perfectly smooth.

The upright side of the member —20— facing the work holder is provided with a lengthwise groove —24— extending downwardly from its upper edge and forming an underlying rib —25— having a transversely beveled upper face —26— for receiving a tool as A' which is preferably dovetailed in cross section.

The upper face of the member —20— in front of the spring portion —23— is preferably flat and horizontal for receiving a clamping plate —27— which together with the underlying portion of the member —20— is provided with registering apertures for receiving a clamping bolt —28— by which the plate —27— may be clamped upon the upper edge of the tool to hold the latter in place.

One side of the plate —27— adjacent the tool A' is provided with a beveled face —29— directly opposite the beveled face —26— and forming therewith a dovetail groove engaging the opposite beveled edges of the cutting blade or tool A'. The opposite edge of the plate —27— is provided with a downwardly projecting rib —30— engaging the adjacent face of the member —20— to assist in holding said plate —27— against lateral movement relatively to its supporting member.

A stop pin —31— is secured in a suitable opening in the member —20— and extends partially across the recess —24— between the pivotal faces —26— and —29— to form a back rest or stop for the rear end of the tool A'.

It will be also observed that the cutting edge of the tool A', Figure 1, is disposed in a vertical plane passing through the shank to facilitate the centering of the tool to the work.

In Figure 3, the arched portion —23— is also resilient but for the purpose of yieldingly supporting the jaw —20— carrying the tool A', and the opening —22— and longitudinal division —21— extend parallel with the axis of rotation of the work not shown.

I claim:

In a lathe tool holder, a head having a shank at one end and its other end face provided with a dove-tailed groove, a tool clamping member divided through one side to form opposite relatively yielding jaws, one of said jaws being provided with a dove-tailed rib seated in said groove, the other jaw being provided with a lengthwise dove-tailed groove for receiving a dove-tailed tool.

In witness whereof I have hereunto set my hand this 22nd day of November, 1922.

FRED A. REED.